(12) United States Patent
Tung

(10) Patent No.: US 7,083,366 B2
(45) Date of Patent: Aug. 1, 2006

(54) LASER POSITIONING DEVICE FOR DRILLING MACHINE

(76) Inventor: Hsin Chih Tung, P.O. Box 26-757, Taipei (TW)

( * ) Notice: Subject to any disclaimer, the term of this patent is extended or adjusted under 35 U.S.C. 154(b) by 303 days.

(21) Appl. No.: 10/719,790

(22) Filed: Nov. 18, 2003

(65) Prior Publication Data

US 2005/0105978 A1 May 19, 2005

(51) Int. Cl.
*B23B 49/00* (2006.01)

(52) U.S. Cl. .......................... 408/16; 408/13; 362/119; 362/259

(58) Field of Classification Search ............... 408/16, 408/13, 8–12; 356/399, 614, 615; 33/286, 33/638
See application file for complete search history.

(56) References Cited

U.S. PATENT DOCUMENTS

| 3,117,480 | A | * | 1/1964 | Peddinghaus | 83/520 |
| 4,078,869 | A | * | 3/1978 | Honeycutt | 408/16 |
| 6,375,395 | B1 | * | 4/2002 | Heintzeman | 408/16 |
| 6,587,184 | B1 | * | 7/2003 | Wursch et al. | 356/4.01 |
| 6,921,235 | B1 | * | 7/2005 | Chen | 408/16 |
| 6,937,336 | B1 | * | 8/2005 | Garcia et al. | 356/399 |
| 2004/0093749 | A1 | * | 5/2004 | Wu | 33/286 |
| 2004/0136795 | A1 | * | 7/2004 | Chen | 408/16 |

* cited by examiner

*Primary Examiner*—Boyer D. Ashley
*Assistant Examiner*—Sara Addisu
(74) *Attorney, Agent, or Firm*—Rosenberg, Klein & Lee

(57) ABSTRACT

A laser-positioning device for a drilling machine includes a carrier base having two accommodating slots and mounted to the outer case of the drilling machine, and a pair of laser sources respectively mounted in the accommodating slots of the carrier base to respectively generate a light beam. The light beams from the laser sources intersect at an intersection point on the piece to be machined indicating the landing point of the drill tool.

8 Claims, 8 Drawing Sheets

LASER POSITIONING DEVICE FOR DRILLING MACHINE

BACKGROUND OF THE INVENTION

1. Field of the Invention

The invention relates to a laser-positioning device for drilling machine, and more particularly to a laser-positioning device that is operable to indicate to the operator the exact location where the drill tool is to be landed to perform drilling.

2. Description of the Related Art

A drilling machine is a common tool machine for domestic use as well as for specific mechanical machining in factories. A drilling machine usually can be pneumatically or electrically driven. By fast rotation, the drill tool bore a hole in the material of the part being machined. A drilling machine generally has a wide range of application and is usually used in repair operations. To perform drilling, an initial center hole usually has to be defined on the piece to be machined.

In performing drilling, the operator usually is guided via his/her visual observation to target the center hole. This often results in a biased position of the drilled hole, which causes imprecision and may require a time-consuming realignment of the drill hole. Realignment of the drill hole further may damage the piece being machined. Therefore there is a need for an apparatus that can overcome the problems of the prior art and enable accurate drilling.

SUMMARY OF THE INVENTION

It is therefore an object of the invention to provide a laser-positioning device for drilling machine that can assist the operator in targeting the center hole, and thereby performing accurate drilling.

It is another object of the invention to provide a laser-positioning device that can be easily mounted on the drilling machine to assist the operator in performing accurate drilling.

To accomplish the above and other objectives, a laser-positioning device of the invention is mounted on an outer case of the drilling machine at location above the drill tool. The laser-positioning device comprises a carrier base having two accommodating slots and fastened to the outer case of the drilling machine, and a pair of laser sources mounted in the accommodating slots to respectively generate a light plane, wherein the light planes intersect into an intersection point on the piece to be machined that is located on the trajectory of the drill tool.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
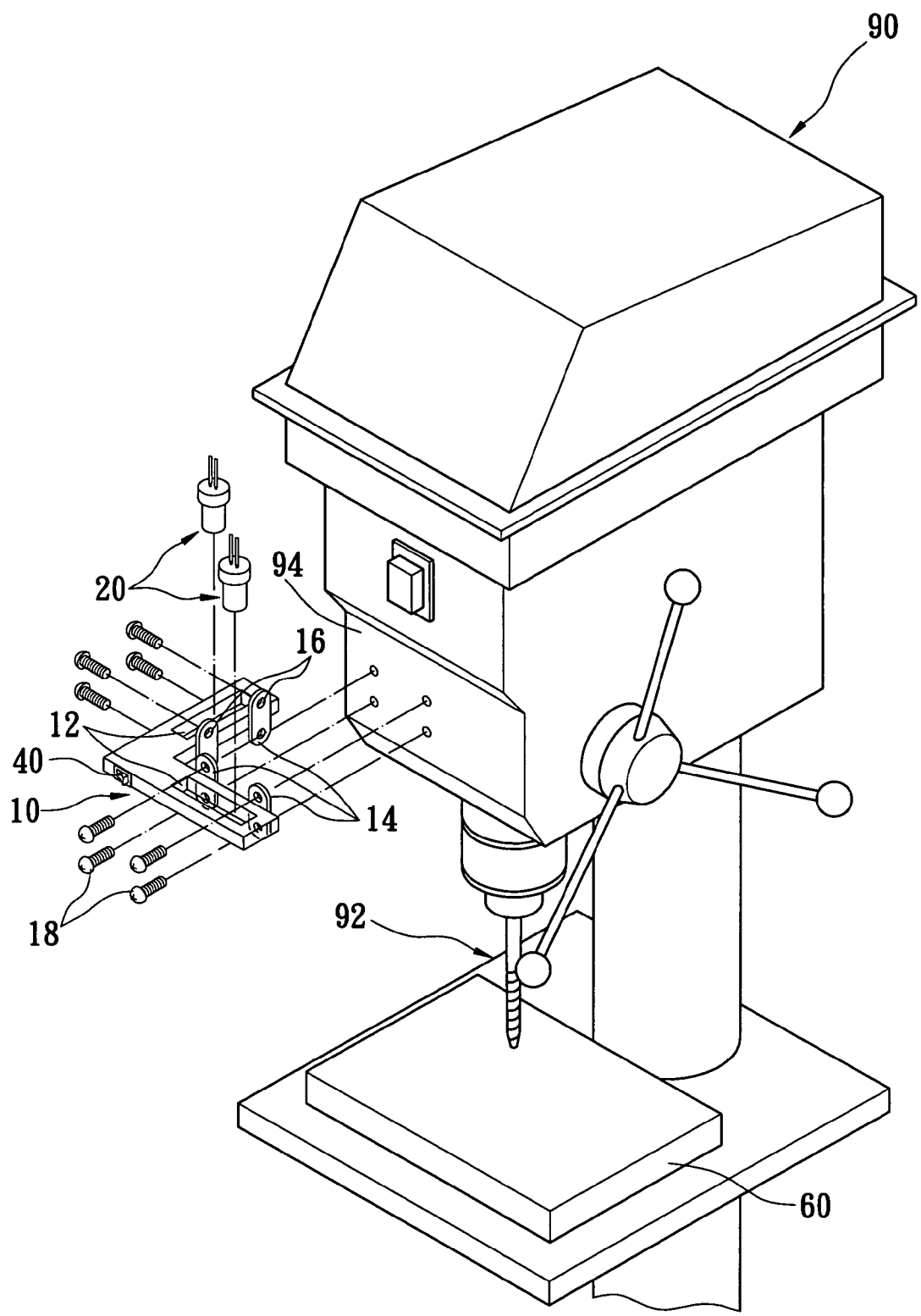
FIG. 1 is an exploded view of a laser-positioning device for a drilling machine according to an embodiment of the invention.

Wherever possible in the following description, like reference numerals will refer to like elements and parts unless otherwise illustrated.

FIG. 1 is an exploded view of a laser-positioning device for processing machines such as drilling machines according to an embodiment of the invention. The drilling machine can be a manually and/or electrically driven processing machine. The laser-positioning device 1 is mounted at a location on outer case 94 that is situated above drilling tool 92. The laser-positioning device 1 includes a carrier base 10, a pair of laser sources 20 assembled on the carrier base 10, and at least a control switch 40 for controlling the laser sources 20.

According to this embodiment, the carrier base 10 can have an outer appearance of generally L-shape, and includes two accommodating slots 12 and attachment ears 14 on inner edges of the carrier base 10. The attachment ears 14 are respectively provided with threaded holes 16 through which screws 18 engage to lock to the outer case 94. The laser sources 20 are assembled via tightly inserting in the accommodating slots 12.

Because the outer case 94 of drilling machine 90 may have different shapes, with planar or curved surfaces, the carrier base 10 is made of, preferably, but not limited to, a lightweight and easily processed material, such as a bakelite material or a plastics material such as acrylic board. Bakelite material particularly provides lightweight, high mechanical strength, good insulating properties, and easy processing advantages. The inner edge of the carrier base 10 can be initially formed with a profile compliant to the outer shape of the carrier base 10, or subsequently machined and corrected for its mounting.

The attachment ears 16 can be formed in a single body with the carrier base 10, protruding vertically at its inner edge. Alternatively, the attachment ears 16 can be separate flat pieces, such as metallic pieces, which are securely fastened on the inner edge of the carrier base 10. When the laser-positioning device is to be mounted on the drilling machine, the inner edge of the carrier base 10 is made to accommodate with the outer profile of the outer case 94 at the location above the drilling tool 92, and the attachment ears 16 then are securely locked to the inner edge of the carrier base 10.

Figure 2:
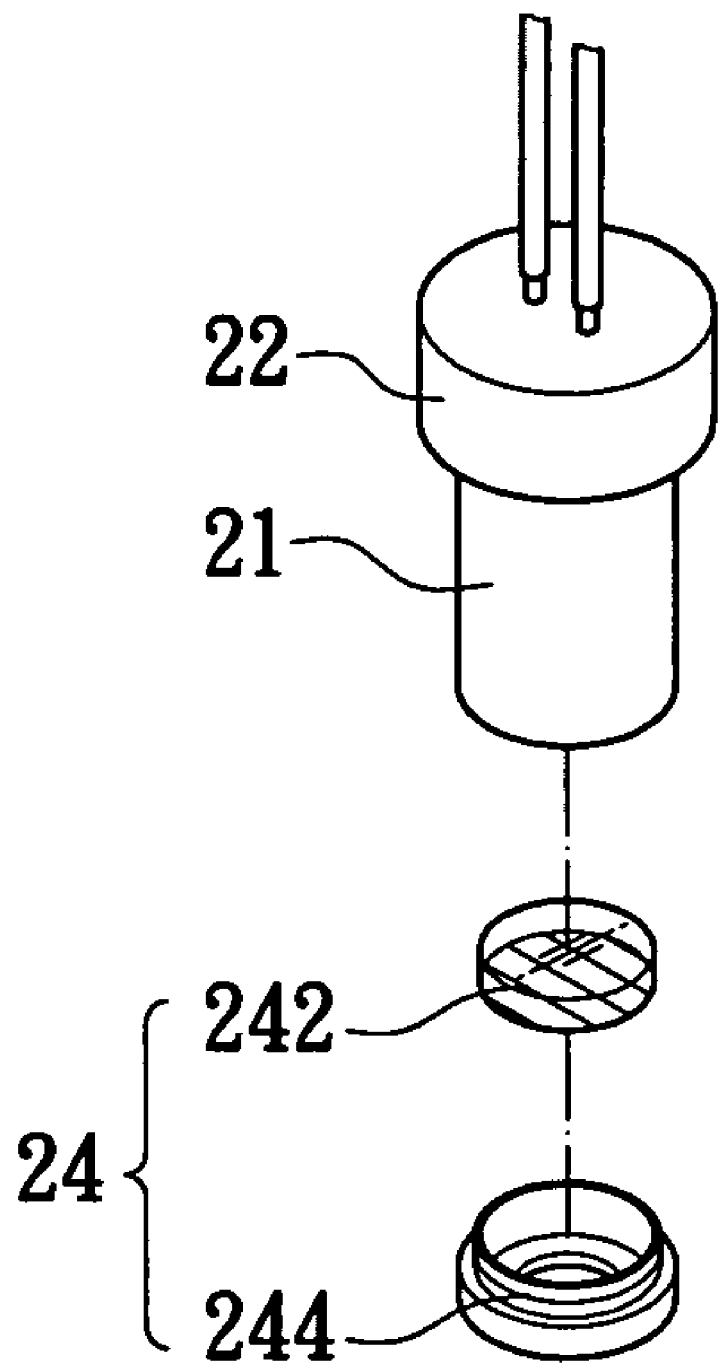
FIG. 2 is a schematic view of a laser source according to an embodiment of the invention.

FIG. 2 is a schematic view of a laser source according to an embodiment of the invention. The laser source used in the embodiment can be a small type laser device usually known in the art, a laser light pen. In addition, a linear-light lens device 24 can be mounted at a front end of the laser source producing a light spot, to convert it to a linear light. The linear-light lens device 24 has a wave-shaped lens 242 securely mounted on an annular frame 244. The linear-light lens device 24 is assembled with the laser source 20 via attaching the annular frame 244 on its lower end. The laser source 20 has a generally T-shaped appearance, including an outer housing 21 and an abutting flange 22 at an upper end. The outer housing 2.1 has a size that fits with the accommodating slots 12.

Figure 3:
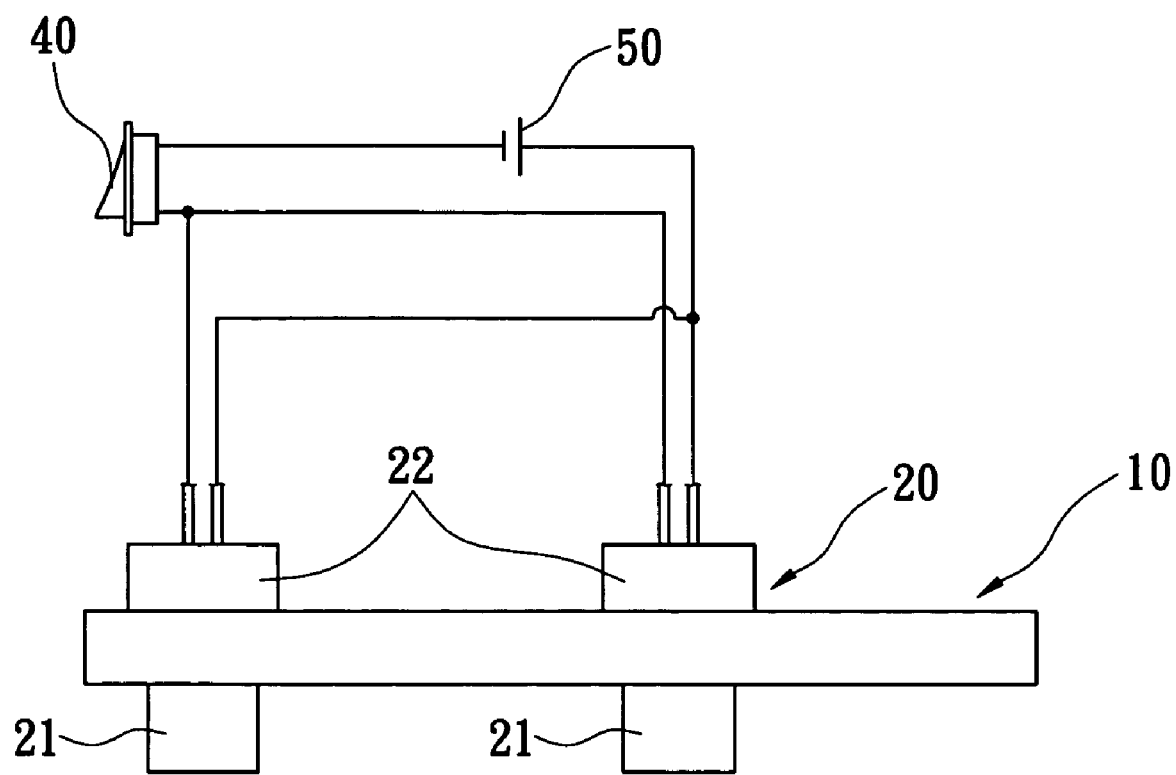
FIG. 3 is a schematic view of an assembled laser-positioning device for drilling machine according to an embodiment of the invention.

FIG. 3 is a schematic view of an assembled laser-positioning device for drilling machine according to an embodiment of the invention. The laser sources 20 are securely held by tight insertion within the accommodating slots 12 of the carrier base 10, and electrically connect to a power source 50. The control switch 40 is operated to control the turn-on or turn-off of the laser sources 20. The power source 50 can be provided via either an adequately commutated power of the drilling machine, or another external electrical source such as an external battery mounted to the carrier base 10. In this latter configuration, the battery can be mounted to, for example, a corner of the carrier base 10 to optimize its occupation space and make it more convenient for replacement operations.

Figure 4:
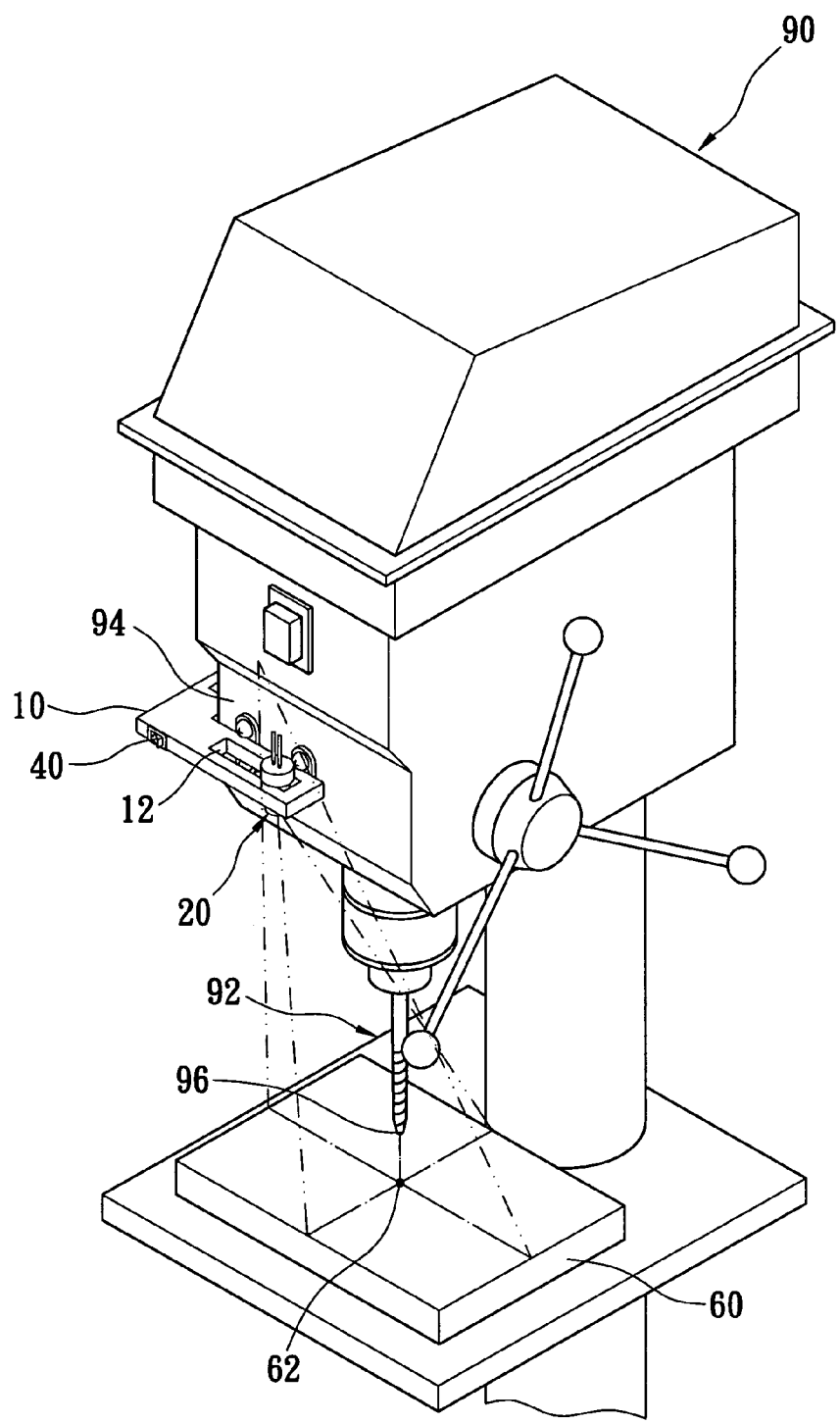
FIG. 4 is an outer perspective view of a laser-positioning device assembled on a drilling machine according to an embodiment of the invention.

FIG. 4 is an outer perspective view of a laser-positioning device assembled on a drilling machine according to an embodiment of the invention. The control switch 40 is mounted to an outer edge of the carrier base 10. The laser sources 20 are respectively mounted in the accommodating slots 12 to project a laser beam on a part 60 to be machined. The laser beam can be adjusted so as to form an intersected light spot 62 on a trajectory of the tip 96 of the drilling tool 92, and thereby guides the operator to perform drilling at the correct location.

Figure 4A:
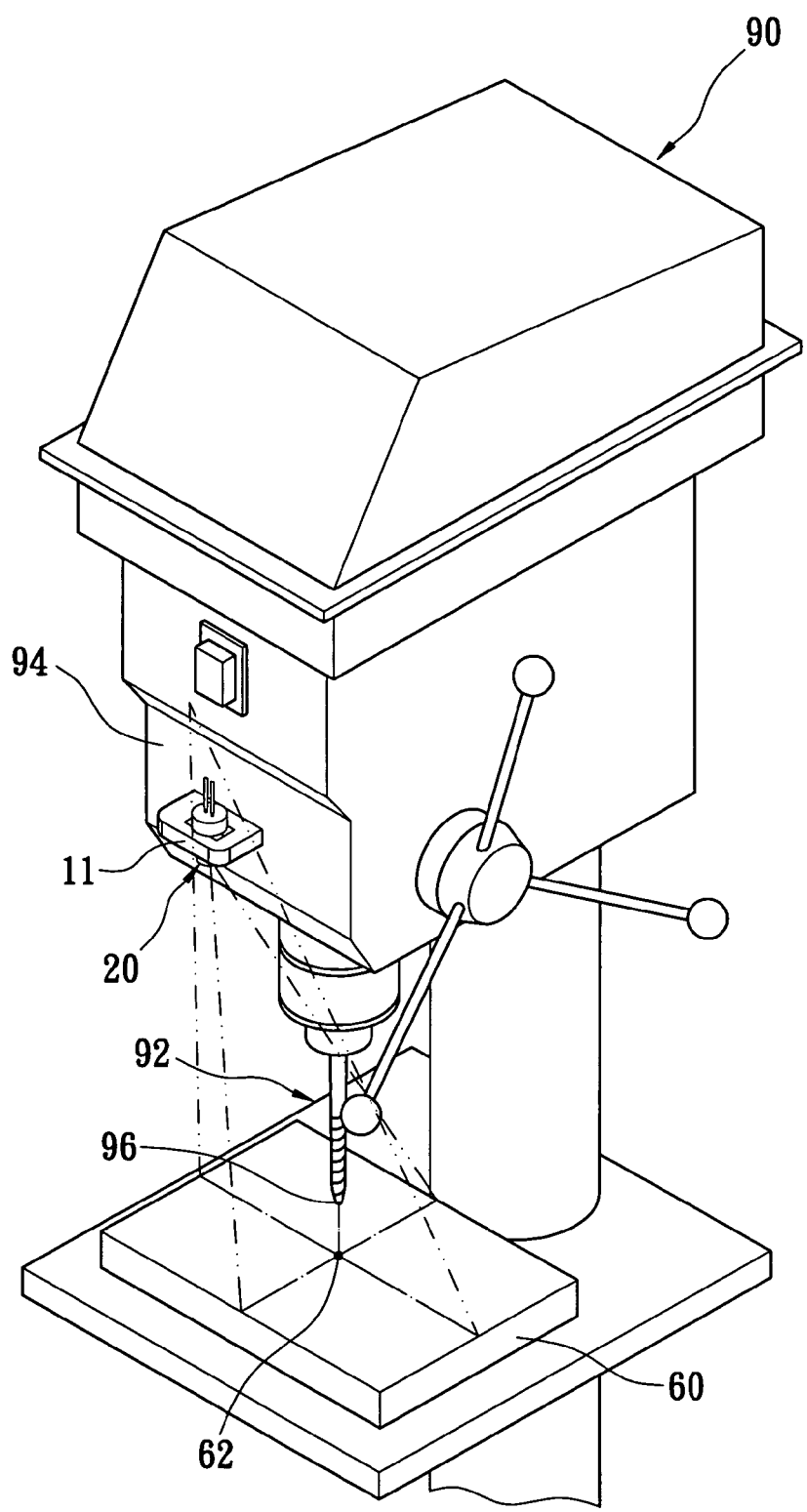
FIG. 4A is a perspective view of a carrier base according to another embodiment of the invention.

FIG. 4A is a perspective view of a carrier base according to another embodiment of the invention. Similar to the previous embodiments, the carrier base serves the functions of mounting the laser sources 20, and assembling to the outer case 94 of the drilling machine. The carrier base 10 therefore can be comprised of a pair of attachment pieces 11 respectively mounted vertically at two sides of the outer case 94, at positions above the drilling tool 92, or the carrier base 10 can be formed and directly incorporated in the outer case 94 in a single body at a location above the drilling tool, for securely mounting the laser sources 20.

Figure 5:
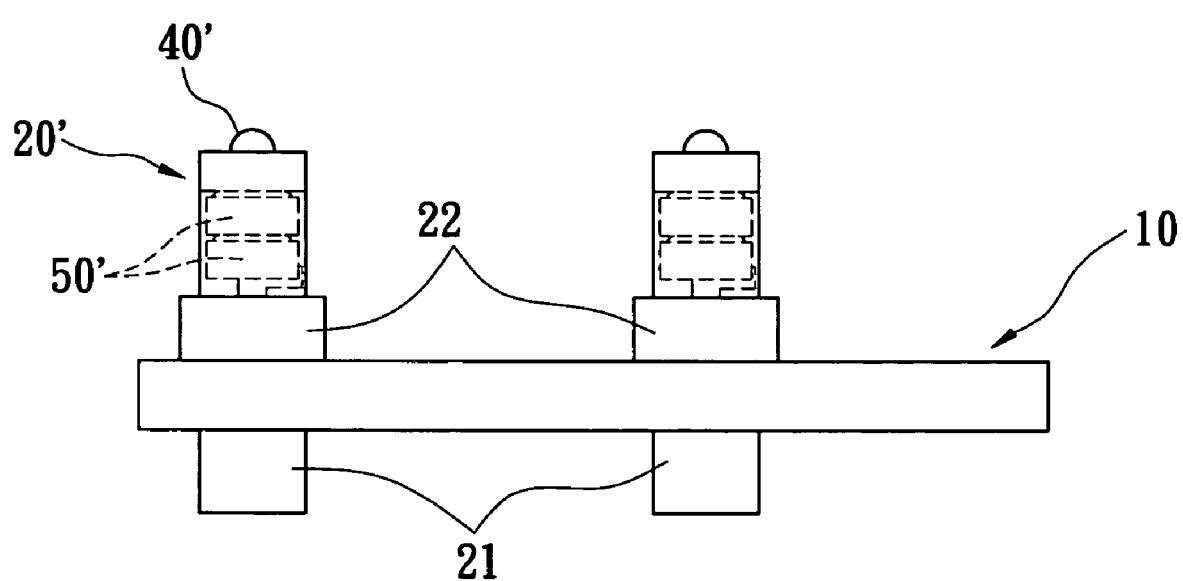
FIG. 5 is a schematic view of a laser-positioning device assembled according to another embodiment of the invention.

FIG. 5 is a schematic view of a laser-positioning device assembled according to another embodiment of the invention. Each laser source 20 can be respectively provided with a control switch 40' at an end portion for controlling the switch of the laser, and a battery 50' mounted internally. This configuration has the advantage of allowing a convenient and fast mounting operation.

Figure 6:
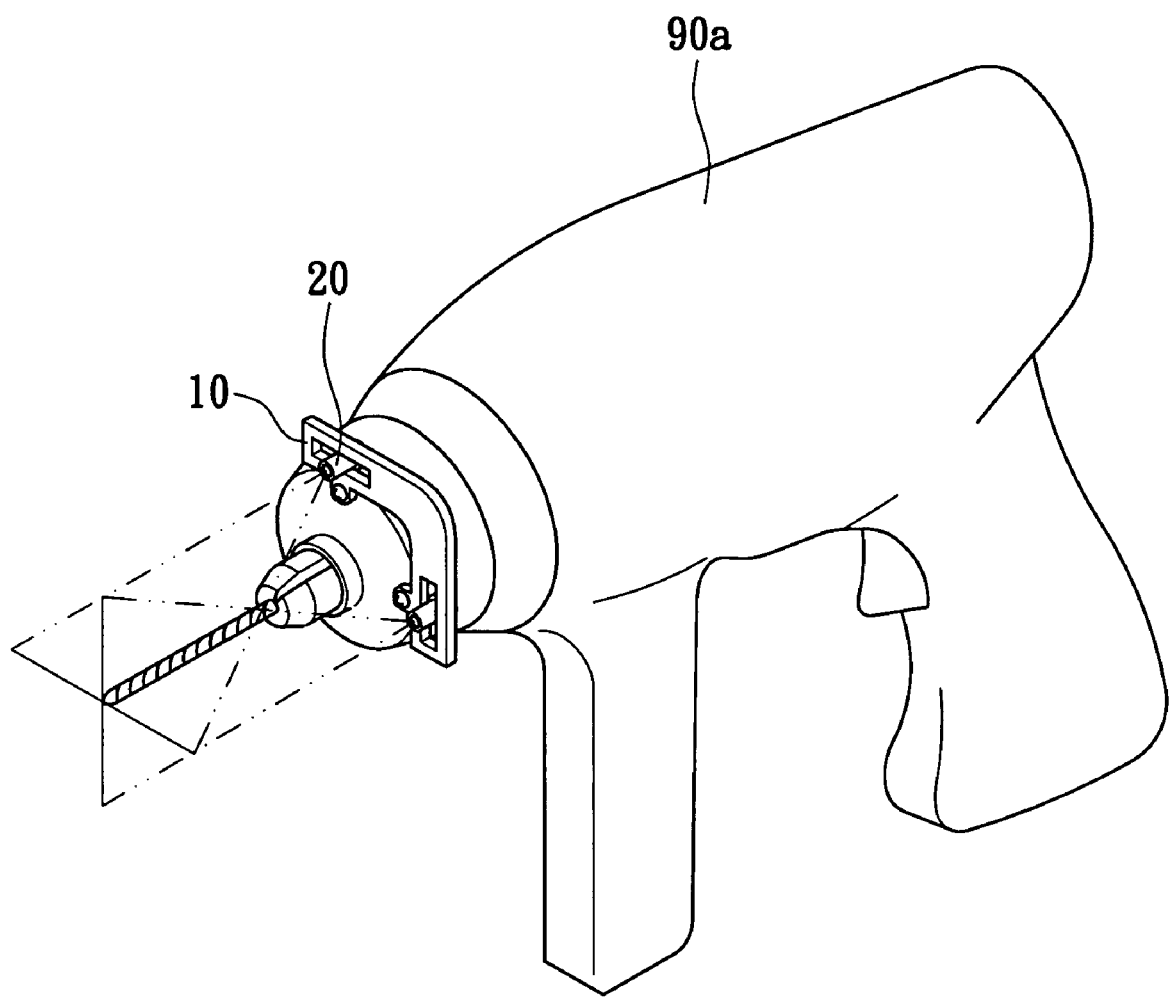
FIG. 6 is an outer perspective view of a laser-positioning device assembled on a boring machine according to another embodiment of the invention.

FIG. 6 is an outer perspective view of a laser-positioning device assembled on a boring machine 90a according to another embodiment of the invention. The attachment ears 14 of the carrier base 10 can extend downwardly parallel to the carrier base 10 to securely attach the laser-positioning device to a front end of the outer case of the boring machine 90a.

Figure 7:
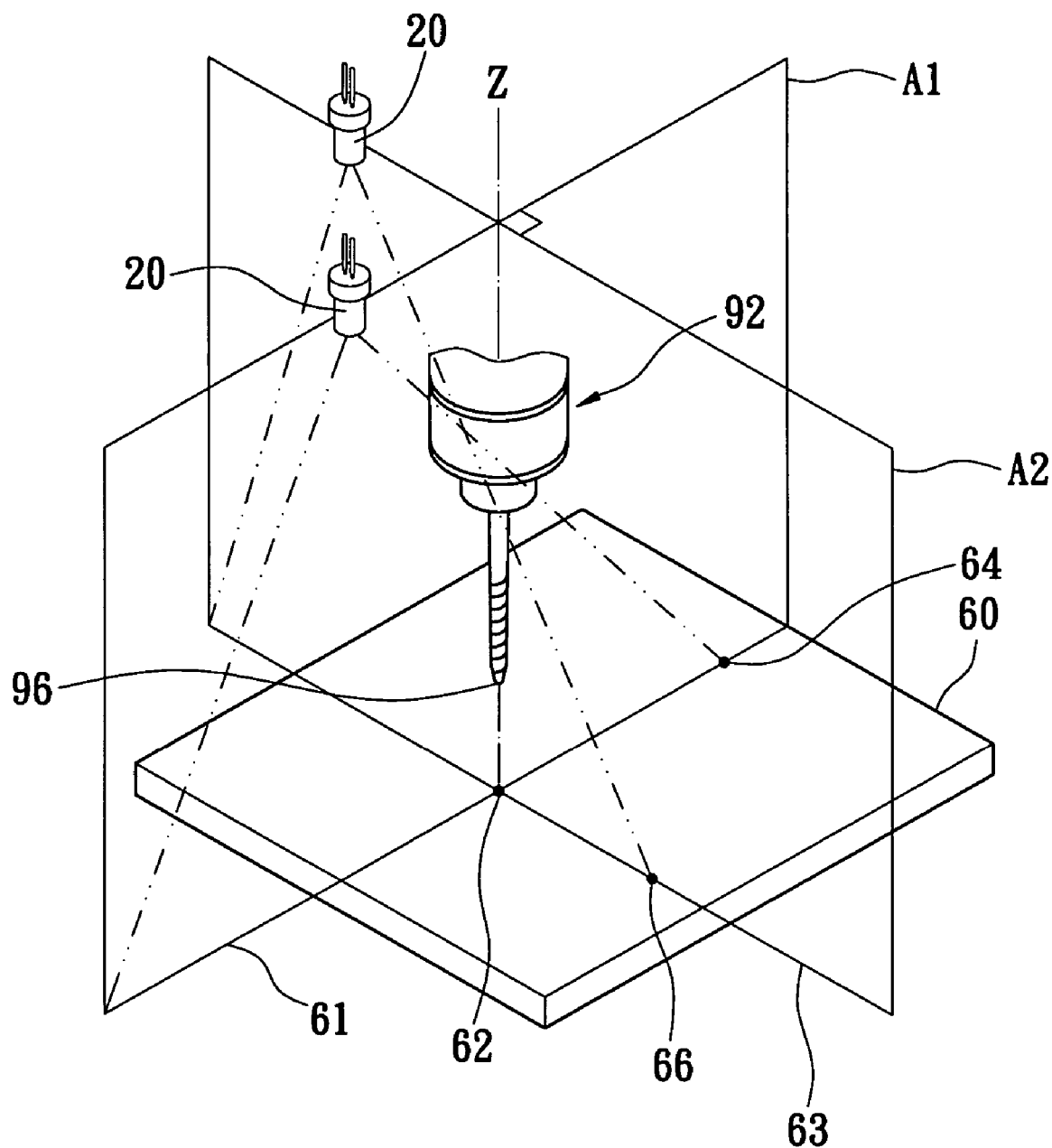
FIG. 7 is a schematic view of the light projection performed by the laser source of the laser-positioning device according to an embodiment of the invention.

FIG. 7 is a schematic view of the light projection performed by the laser source of the laser-positioning device according to an embodiment of the invention. Light projection can be adjusted via the following method.

(1) providing a smooth surface of a part to be machined 60;

(2) landing the drill tool on the part 60 to form a drill point, which is an intersection point 62 of two projected laser light lines;

(3) two lines 61, 63 intersecting at drill point 62 then are drawn on the surface of the part 60;

(4) points 64, 66 are respectively selected on the lines 61, 63, so as to form two planes A1, A2 intersecting at the axis Z, which supports the trajectory of the tip 96 of the drill tool 92;

(5) adjusting the light projection angle of one laser source 20 to have the light projection pass through the drill tool tip 96, the drill point 62 and the point 64, thereby ensuring that it located in the plane A1; and (6) adjusting the light projection angle of the other laser source 20 to have the light projection pass through the drill tool tip 96, the drill point 62 and the point 66, thereby ensuring that it located in the plane A2; the intersection point resulting from the light projection from the two laser sources 20 thereby corresponds to the drill point 62 of the drill tool 92.

To perform accurate drilling, the operator can use the intersection point 62 projected from the laser sources on the to-be-machined part 60 to define the hole to be drilled, and imprecision due to visual targeting of the drill point thereby is overcome.

As described above, the laser-positioning device of the invention has at least the following advantages:

(1) The operator can perform accurate drilling;

(2) The laser-positioning device of the invention can be easily mounted on a conventional drilling machine to perform assist the operator in accurately positioning the drill location.

It should be apparent to those skilled in the art that the above description is only illustrative of specific embodiments and examples of the invention, and should not be construed in a limiting way. Therefore, the invention should cover various modifications and variations made to the herein-described structure and operations of the invention, provided they fall within the scope of the invention as defined in the following appended claims.

What is claimed is:

1. A laser-positioning device for a drilling machine being placed at a location of an outer case of the drilling machine above the drill tool, the laser-positioning device comprising:
   a carrier base having two accommodating slots and being securely fastened to the outer case, the carrier base having a generally L-shaped contour with a plurality of attachment ears assembled at an inner edge of the carrier base, each attachment ear having at least one threaded hole for fastening to the outer case of the drilling machine, the attachment ears being formed with the carrier base in a single body and protrude vertically at an inner edge of the carrier base; and
   a pair of laser sources, respectively mounted in the accommodating slots of the carrier base to respectively project a light beam, wherein the light beams of the laser sources forms an intersecting point on a trajectory of the drill tool.

2. The laser-positioning device of claim 1, wherein the carrier base comprises a pair of attachment pieces respectively arranged at a location of the outer case of the drilling machine above the drill tool.

3. The laser-positioning device of claim 1, wherein the laser sources are securely mounted by tight insertion in the accommodating slots.

4. The laser-positioning device of claim 1, wherein each laser source includes at least a control switch for controlling switching of the laser source, and at least a power source to drive the laser source.

5. The laser-positioning device of claim 4, wherein the control switch is located at an outer edge of the carrier base, and the power source is a battery mounted on the carrier base.

6. The laser-positioning device of claim 4, wherein each laser source includes a control switch at an end portion of the laser source, and a battery placed inside the laser source.

7. The laser-positioning device of claim 1, wherein the light beams from the laser sources are perpendicular to each other and are projected respectively on an axis X and an axis Y of the drilling machine, thereby a drill point is defined on a part to be machined by projection of the laser beams thereon.

8. A The laser-positioning device for a drilling machine being placed at a location of an outer case of the drilling machine above the drill tool, the laser-positioning device comprising:

a carrier base having two accommodating slots and being securely fastened to the outer case, the carrier base having a generally L-shaped contour with a plurality of attachment ears assembled at an inner edge of the carrier base, each attachment ear having at least one threaded hole for fastening to the outer case of the drilling machine, the attachment ears being flat pieces fastened to the inner edge of the carrier; and a pair of laser sources, respectively mounted in the accommodating slots of the carrier base to respectively project a light beam, wherein the light beams of the laser sources forms an intersecting point on a trajectory of the drill tool.

* * * * *